Figure 1:
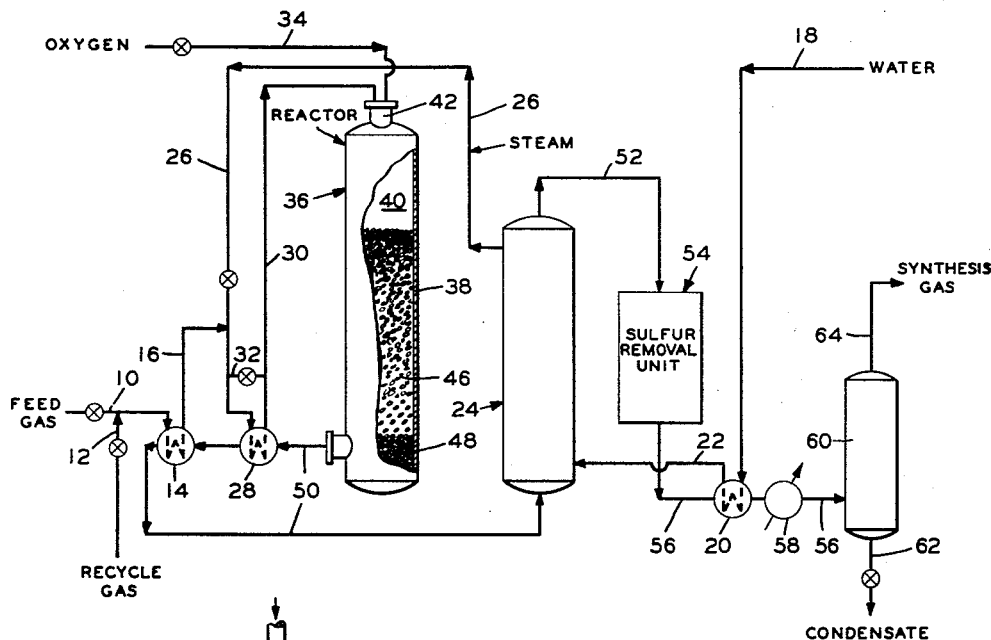

June 28, 1960 J. B. DWYER 2,942,958
PROCESS FOR THE CONVERSION OF A NORMALLY GASEOUS
HYDROCARBON TO CARBON MONOXIDE AND HYDROGEN
Filed July 3, 1953

INVENTOR.
JOHN BARTHOLOMEW DWYER
BY G. H. Palmer
Cruzan Alexander
ATTORNEYS

United States Patent Office 2,942,958
Patented June 28, 1960

2,942,958
PROCESS FOR THE CONVERSION OF A NORMALLY GASEOUS HYDROCARBON TO CARBON MONOXIDE AND HYDROGEN

John B. Dwyer, Baldwin, N.Y., assignor to The M. W. Kellogg Company, Jersey City, N.J., a corporation of Delaware Filed July 3, 1953, Ser. No. 365,970

4 Claims. (Cl. 48—196)

This invention relates to the preparation of a gas rich in hydrogen. In one aspect the invention relates to the preparation of a feed gas comprising hydrogen and carbon monoxide suitable for the synthesis of hydrocarbons.

In the gasification of coal with oxygen and steam at elevated pressures by modern methods, as exemplified by the Lurgi process, considerable amounts of methane are produced along with hydrogen. Although this methane-containing gas is useful for many purposes, it is desirable to improve it considerably, particularly when used in a hydrogenation process or as a feed for the Fischer-Tropsch hydrocarbon synthesis. In the Fischer-Tropsch process, hydrogen and carbon monoxide are converted into hydrocarbons including those in the gasoline range and into oxygenated organic compounds, such as alcohols and ketones. Methane and other gaseous hydrocarbons are not polymerized into higher hydrocarbons in the Fischer-Tropsch process; therefore, greater efficiency can be realized by converting the methane and gaseous hydrocarbon components of synthesis feed gas into hydrogen and carbon monoxide. In the gas preparation method described hereinafter, this is accomplished by the partial combustion of a portion of the methane with oxygen and the reformation of another part of methane with steam. By this means synthesis feed gases with methane content below 5 volume percent can be economically prepared from gases containing sizeable amounts of methane. Although the process of the present invention is specifically disclosed in connection with modifying a coal gas into a synthesis feed; it can be employed for similarly converting natural gas, methane and other normally gaseous hydrocarbons.

An object of the present invention is to provide an improved method for the preparation of a gas rich in hydrogen.

A second object of the invention is to provide an improved method for the preparation of a hydrocarbon synthesis feed gas comprising hydrogen and carbon monoxide.

Another object of the invention is to provide an improved method for the conversion of coal gas into a hydrocarbon synthesis feed gas.

Still another object is to increase the conversion of methane in a partial combustion reforming operation to yield a gas rich in hydrogen and containing a minimum of unreacted methane.

Another object is to provide a method for conversion of methane to hydrogen and oxides of carbon with a minimum of carbon formation in the reaction zone.

Various other objects and other advantages of the present invention will become apparent to those skilled in the art from the accompanying description and disclosure.

The present invention relates to a process for the simultaneous partial combustion and reforming of a normally gaseous hydrocarbon with a restricted quantity of oxygen in the presence of sufficient steam to both prevent carbon deposition and to shift the reaction equilibrium to promote the formation of hydrogen over carbon monoxide. The entire operation is carried out in the presence of a fixed bed of contact material comprising a catalyst for the reaction. In one embodiment, the invention relates to the production of a hydrocarbon synthesis feed from a mixture of coal gas and recycled product gas from the synthesis reactor. By this process it is possible to produce additional hydrogen and carbon monoxide in a mol ratio exceeding 2:1 respectively. This is important inasmuch as superior results have been obtained in hydrocarbon synthesis in which the feed contained more than two mols of hydrogen per mol of carbon monoxide. In another embodiment the invention is concerned with production of substantially pure hydrogen for such processes as hydrogenation, hydroforming, and synthesis of ammonia.

For a fuller understanding of the nature and subjects of the invention, reference should be had to the following detailed description taken in connection with the accompanying drawings, in which Figure 1 is a flow sheet of a plant capable of converting methane or natural gas and other normally gaseous hydrocarbons, such as ethane and propane, into hydrogen and carbon monoxide. The flow sheet of the drawing is only one example of many applications of the present invention and should not be construed as unnecessarily limiting thereto.

The charge gas introduced through valved line 10 at elevated pressure is derived from the gasification of coal by the well-known Lurgi process in which volatiles and inorganic sulfur compounds are removed leaving only a small amount of sulfur in the form of organic compounds.

It is often desirable to recycle a portion of the gaseous components of the hydrocarbon synthesis effluent to the synthesis feed preparation in order to utilize its content of light hydrocarbons. Accordingly, after the removal of oxygenated organic compounds and hydrocarbons containing more than three carbon atoms, part of the cooled synthesis product gas is optionally returned to the plant shown herein at elevated pressure through line 12 which connects with pipe 10. The mixed gases are given their initial preheat in passing through heat exchanger 14 into pipe 16. At this point a typical feed gas mixture including recycle gas comprises the following composition:

| | Vol. percent |
|---|---|
| $N_2$ | 4.7 |
| $H_2$ | 51.2 |
| CO | 17.5 |
| $CO_2$ | 4.5 |
| $CH_4$ | 20.3 |
| $C_2H_6$ | 1.2 |
| $C_3H_8$ | 0.6 |
| | 100.0 |

To furnish the steam required in the process, hot water is pumped into line 18 at elevated pressure at the rate of 1.7 mols of water per mol equivalent of organic carbon in the gaseous feed. This feed rate may range between about 1.0 and about 2.0 mols of water per mol of organic carbon. After further heating in heat exchanger 20, the water is passed via pipe 22 to waste heat boiler 24, in which it is converted into steam at 400 pounds per square inch gage (p.s.i.g.) by heat recovered from the reaction products. The admission of this steam to the reaction system is controlled by the valve in line 26. The gas in pipe 16 flows into line 26 and the gas-steam mixture is preheated in heat exchanger 28 to between about 1000° F. and about 1400° F., 1200° F. or lower being recommended, and leaves in line 30. To control the temperature of the gaseous mixture in line 30, a valved by-pass 32 around the heat exchanger is provided. Although the valve in by-pass 32 may be adjusted manually, it is preferred to use conventional automatic controls to open this valve when the temperature in line 30 exceeds the desired temperature and to throttle the flow through valve when the temperature in line 30 drops below the selected preheat temperature. Since the degree of preheat is not far below the point at which methane begins to crack or decompose into carbon and hydrogen at an appreciable rate, the temperature should be carefully controlled. Relatively low preheat temperatures are desirable in order to minimize carbon formation in both the preheating zone and reaction zone.

Oxygen for the reaction with a 2 percent nitrogen content is admitted through pipe 34 from an oxygen liquefaction plant at the rate of about 0.3 to about 0.7 mol of oxygen per equivalent of carbon present as hydrocarbons. The preferred oxygen feed rate is 0.49 mol per equivalent of organic carbon.

Reactor 36 is a steel cylindrical vessel lined throughout with a layer of refractory insulation 38, such as alundum or zirconia. A deep bed of reforming catalyst 46 is supported at the bottom on a layer 48 of crushed fire brick.

Although any reforming catalyst for the steam-methane reaction is suitable for the instant process, nickel, chromium, cobalt or their oxides are preferred and best results are obtained when these materials are deposited on refractory supports. The data set forth herein is based on a catalyst having 20 to 25 percent nickelous oxide on kaolin or zirconia or other refractory metal oxide support.

The gas-steam mixture in line 30 and the oxygen from line 34 is introduced into catalyst bed 46 in such a manner that burning is not effected until all the reactants are simultaneously in contact with the catalyst. The maximum temperature obtained is usually at the top of reactor 36 and varies between 1800° F. and 2200° F. and, as the gases proceed downward, this temperature decreases between 150° and 500° by the time the refractory brick layer 48 is reached. The temperatures in the bed of reforming catalyst depend primarily upon the temperature at which the reactants enter the bed.

Combining the combustion and reforming reactions in a single vessel is extremely desirable, since the reforming not only aids in reducing the combustion temperatures to those which available catalysts and conventional construction materials can stand but in so doing utilizes the exothermic heat of combustion directly to supply the endothermic heat of reforming with maximum heat transfer efficiency. Although this operation may be carried out at either atmospheric or elevated pressure, pressures of around 150 to 350 pounds per square inch gage are recommended, since it is desirable to operate the synthesis reactor at elevated pressures. Moreover, increasing the pressure in reactor 36 increases the capacity of the unit greatly with only minor decrease in the percentage conversion of methane.

In the preferred embodiment of the present invention the reactants are admixed prior to introduction into the catalyst bed 46 and the admixture is passed into the catalyst bed in a manner such that substantially no partial oxidation of the normally gaseous hydrocarbons to hydrogen and carbon monoxide is effected until the reactants contact the catalyst. This is accomplished by admixing the reactants, steam, methane and oxygen in mixer 42 of reactor 36 and passing the admixture from mixer 42 at a gas velocity above about 10 feet per second into catalyst bed 46, preferably the velocity is between about 50 and about 150 feet per second. The time from the point of mixing to the point where the reactants first contact the catalyst bed 46 is less than about 0.2 second and preferably a time between about 0.01 and about 0.05 second. Both velocity and contact time are important factors in transferring the admixture from mixer 42 to catalyst bed 46. During the travel of the reactants while in admixture from mixer 44 to catalyst bed 46 some reaction is being effected. This reaction, however, is mainly the formation of intermediate products in the production of hydrogen and carbon monoxide.

When a critical concentration of reaction intermediates is reached, flame combustion will occur. Should combustion occur before the mixture reaches the catalyst bed, exothermic reactions will raise the temperature of the gas considerably, and thermal decomposition of the residual hydrocarbons will take place, with resultant formation of carbon. Endothermic reforming reactions will not, in the absence of a catalyst, occur to a sufficient extent to prevent carbon formation.

On the other hand, when combustion is delayed until the gas mixture contacts the catalyst, endothermic reforming reactions promoted by the catalyst will occur simultaneously with the oxidation reactions. Thus the maximum temperature attained will not exceed the limits for the catalyst or materials of construction of the chamber and furthermore formation of carbon is avoided by the catalytic reforming.

Therefore, this concentration of intermediate reaction products in the space between the catalyst bed 46 and mixer 42 must be maintained below that at which combustion is effected. The concentration of intermediate reaction products is increased above that which normally forms at any one point by diffusion of such reaction products backward through the flowing gases. If the velocity is maintained sufficiently high and the time element sufficiently low this concentration cannot build up prior to contact with the catalyst bed 46. The velocity and time also must be such that the heat formed by the exothermic reaction will not progress backward through the gases to such an extent that combustion will be effected prior to the reactants and intermediate reaction products meeting the catalyst.

The reactants are admixed prior to the reactor proper for mechanical reasons. Thus, there will always be considerable space between the point at which the reactants are mixed and the point at which the reactants first contact the catalyst.

The reactants themselves may include natural gas or methane alone, and steam, and substantially pure oxygen. However, air may be used in place of pure oxygen. Also, the reactants may include other gases, such as nitrogen, hydrogen, carbon monoxide, carbon dioxide; and other normally gaseous hydrocarbons, such as ethane, propane and butane, and olefins, such as ethylene and propylene without departing from the scope of this invention.

The reaction products exit at the bottom of the reactor through line 50. Upon passing through heat exchangers 28 and 14 the temperature of the products is reduced in preheating the reactant gases and steam. After further cooling in waste heat boiler 24, the gases are passed through pipe 52 to sulfur removal unit 54. During the treatment in reactor 36, substantially all of the organic sulfur content of gas charged is converted into inorganic sulfur compounds. Consequently, the reaction products entering unit 54 contain 0.74 milligram of inorganic sulfur per cubic foot, measured at 60° F. and 29.92 inches of mercury. The sulfur removal unit is of the "Luxmasse" type containing a mixture of sodium carbonate and sponge iron. The removal system consists of two towers which are operated in series except when the sulfur removal agent is being discarded from one of the towers. Other sulfur removal systems are also suitable for the present purpose and may be substituted if desired. The sulfur content of the purified gas leaving in line 56 is only 0.07 mgm./cu. ft., a quantity small enough to be unobjectionable in hydrocarbon synthesis. Feed water heater 20 reduces the temperature of the gas in pipe 56 and this is further reduced by cooler 58 to 120° F. The water condensed in cooler 58 is separated in knock-out drum 60 and withdrawn through drain 62 while synthesis feed gas passes overhead through line 64. This gas has the following typical composition:

| | Vol. percent |
|---|---|
| $N_2$ | 3.7 |
| $H_2$ | 61.6 |
| $CO$ | 22.2 |
| $CO_2$ | 7.2 |
| $CH_4$ | 4.7 |
| $H_2O$ | 0.6 |
| | 100.0 |

The hydrogen-carbon monoxide mol ratio is 2.78:1, and the products have a 36.3 percent greater volume than the charging gas in line 16.

From a comparison of the reactants and products set forth herein, it would be contemplated that the reactions in vessel 36 involved partial combustion almost entirely. This is not the case, however, as is apparent from the endothermicity indicated by the temperature drop from the top to the bottom of reactor 36. Moreover, the additional hydrogen and carbon monoxide produced in vessel 36 are in a molar ratio of 2.59:1, respectively. The partial combustion of methane conventionally produces less than 2 mols of hydrogen for each mol of carbon monoxide formed; whereas the product of reforming methane with steam has an $H_2/CO$ ratio above 2:1. Thus the steam plays an important part in the various reactions taking place in reactor 36 despite the fact that the reaction products contain slightly more steam than was introduced into the reaction. Transient or intermediate products are probably formed in the preparation of the desired synthesis feed without appearing in the final product of the gas-making process.

The presence of steam reduces the reaction temperatures in two ways and it will be noted that the steam introduced is far in excess of that required in reforming reactions. As a diluent, steam cools the combustion reaction by absorbing sensible heat therefrom. As a reactant, steam reforms methane and other light hydrocarbons endothermically with attendant cooling of the reaction gases. The steam also prevents the deposition of carbon from the partial combustion of methane, whereas the experience of prior workers has been that cooling this combustion reaction increased the deposition of carbon therein. A further function of the steam lies in reducing the required quantity of oxygen, the most expensive reactant in the system, over 10 percent. For partial combustion alone the optimum mol ratio of oxygen to methane is about 0.55, whereas the optimum ratio in the present process is 0.48 or less. Another very considerable effect of the large quantities of steam present in the reactor 36, is to shift the equilibrium of the water gas reaction: $CO_2+H_2\rightleftharpoons CO+H_2O$ to the left, thereby favoring the production of hydrogen over carbon monoxide. This provides a better hydrogen to carbon monoxide ratio in the resulting synthesis feed gas.

Although reactor 36 provides the preferred setting for the desired reactions, various alternative arrangements therein are apparent to those skilled in the art. For example, the burner may be located at the bottom of the reaction vessel and the outlet for reaction products at the top. One or more of the oxygen, steam or recycle gas may be introduced at one or more locations along the reactor removed from the burner, or a portion may be so introduced while the remainder is admitted at the burner. Another variation in the reactor consists in filling the zone adjacent the burner with a less active reforming catalyst while the remainder of the reactor is filled with the usual reforming catalyst. An example of the less active catalyst is crushed fire brick impregnated with a sufficient quantity of a suitable solution of a nickel salt to provide a nickelous oxide content of about 8 to about 15 percent. Also the bottom of the reactor may be filled with a mere active catalyst, such as chromia on a suitable support. In such arrangements due consideration should be paid to maintaining the partial combustion and reforming zone temperatures within the limits indicated. Since it is possible that the nickel content of the catalyst may be reduced by the vaporization of nickel as nickel carbonyl, it may be desirable to provide means for injecting a vaporized nickel nitrate solution into the reactor to make up for such losses. Although air may be employed as a source of oxygen, this practice is not recommended, since it dilutes the reactants throughout the system thereby requiring larger equipment and also increases the amount of useful gases in the synthesis product gas which must be vented rather than recycled in order to keep the percent of nitrogen in the synthesis system within feasible limits. Enriched air or substantially pure oxygen is preferred.

Figure 2:
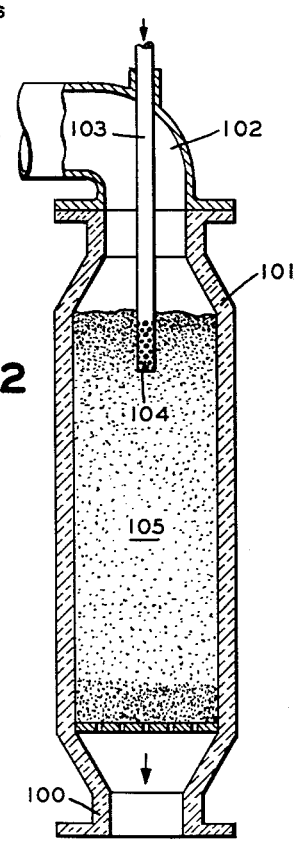

In accordance with another modification of the invention as shown in the elevational view of Figure 2 of the drawings, control of the contact of reactants prior to the build up of intermediate reactants is achieved by separately introducing the reactants directly into the catalyst bed. According to Figure 2, numeral 101 indicates a reactor similar to reactor 36 of Figure 1 and to be used in the process described with regard to Figure 1. The normally gaseous hydrocarbon to be reacted is passed into reactor 101 through conduit 102 into catalyst bed 105. The oxidizing gas, such as pure oxygen, is introduced separately into catalyst bed 105 of reactor 101 through conduit 103. The oxygen is dispersed in the upper portion of the bed through perforations 104 at the end of conduit 103. The conduit is inserted a short distance into the catalyst bed 105 as shown in elevation by the drawing. The reaction products are removed from reactor 101 through conduit 100.

Figure 3:
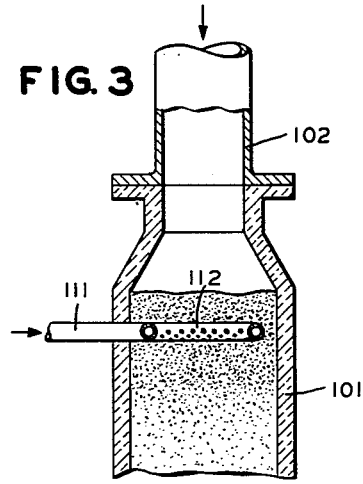

Figure 3 of the drawing is a modification of Figure 2 in which the oxygen or oxidizing gas is introduced through conduit 111 into a ring dispersing means 112 containing perforations therein to disperse the gases directly into the catalyst bed as shown by Figure 3.

In Figures 2 and 3, steam may be introduced with the oxygen in conduit 103 or 111, or may be introduced with the normally gaseous hydrocarbons through conduit 102. Also, steam may be introduced with both the oxygen and the steam in the respective conduits indicated without departing from the scope of this invention. The present invention applies not only to the partial oxidation of hydrocarbons in the presence of steam but also the partial oxidation of hydrocarbons without the use of steam. The same rule of introduction of the reactants is applied in either case where simultaneous reforming is taking place with the partial combustion or in the case where partial combustion alone is employed.

The nozzle 42 of Figure 1 is suitably constructed of alfrax or a metal, such as steel. In the case of steel the nozzle contains a jacket which is cooled by water under pressure. The distance between the end of the nozzle and the top of the catalyst bed 46 is between about 0 and about 10 inches, preferably not more than about 3 inches. This distance may be extended if a conduit is used leading from the end of the nozzle directly into the catalyst bed. A suitable length of conduit from the end of the nozzle to the end of the catalyst bed is about 6 inches. Best results have been observed when the oxygen is introduced into the nozzle through inlets situated at a 30° angle declined from the vertical end in a tangential direction.

Since certain changes may be made in carrying out the above process without departing from the scope of the invention, it is intended that all matter contained in the above description shall be interpreted as illustrative and not in a limiting sense.

Having described my invention, I claim:

1. In a process for the conversion of a normally gaseous hydrocarbon to a gas comprising hydrogen and carbon monoxide in which oxygen and steam are reacted with said normally gaseous hydrocarbon in said reaction zone containing a fixed bed of contact material comprising a catalyst for the reaction to produce hydrogen and carbon monoxide, the improvement which comprises preheating said normally gaseous hydrocarbon and steam to a temperature between about 1000° F. and about 1400° F., admixing said preheated steam and normally gaseous hydrocarbon with oxygen, introducing the resulting admixture into said reaction zone into contact with said bed of contact material, maintaining the velocity of said admixture between the point of admixture and the initial contact with said bed of contact material above 50 feet per second, controlling the velocity of said admixture and the distance between the point of admixture and the initial contact of the admixture with the bed of contact material such that the lapse of time is between about 0.01 and 0.05 second, maintaining the mol ratio of oxygen and steam to organic carbon between about 0.3 and about 0.7 and between about 1 and about 2, respectively, and a reaction temperature between about 1800° F. and about 2200° F. and a pressure between about 150 and about 350 pounds per square inch gage such that an effluent is produced containing hydrogen and carbon monoxide in a mol ratio above 2:1 and containing less than 5 volume percent unreacted normally gaseous hydrocarbon.

2. In a process for the conversion of methane to a gas comprising hydrogen and carbon monoxide in which oxygen and steam are reacted with said methane in a reaction zone containing a fixed bed of contact material comprising a catalyst for the reaction to produce hydrogen and carbon monoxide, the improvement which comprises preheating methane and steam to a temperature between about 1000° F. and about 1400° F., admixing said preheated steam and methane with oxygen, introducing the resulting admixture into said reaction zone into contact with said bed of contact material, maintaining the velocity of said admixture between the point of admixture and the initial contact with said bed of contact material between about 50 and about 150 feet per second, controlling the velocity of said admixture and the distance between the point of admixture and the initial contact of the admixture with the bed of contact material such that the lapse of time is between about 0.01 and about 0.05 second, maintaining the mol ratio of oxygen and steam to methane between about 0.3 and about 0.7 and between about 1 and about 2, respectively, and a reaction temperature between about 1800° F. and about 2200° F. and a pressure between about 150 and about 350 pounds per square inch gage such that an effluent is produced containing hydrogen and carbon monoxide in a mol ratio above 2:1 and containing less than 5 volume percent unreacted normally gaseous hydrocarbon.

3. The process of claim 2 in which said contact material comprises a nickel oxide supported on a refractory material.

4. In a process for the conversion of a normally gaseous hydrocarbon to a gas comprising hydrogen and carbon monoxide in which oxygen and steam are reacted with said normally gaseous hydrocarbon in said reaction zone containing a fixed bed of contact material comprising a catalyst for the reaction to produce hydrogen and carbon monoxide, the improvement which comprises preheating said normally gaseous hydrocarbon to a temperature between about 1000° F. and about 1400° F., admixing said preheated normally gaseous hydrocarbon, steam and oxygen, introducing the resulting admixture into said reaction zone into contact with said bed of contact material, maintaining the velocity of said admixture between the point of admixture and the initial contact with said bed of contact material above 50 feet per second, controlling the velocity of said admixture and the distance between the point of admixture and the initial contact of the admixture with the bed of contact material such that the lapse of time is between about 0.01 and about 0.05 second, maintaining the ratio of oxygen and steam to organic carbon between about 0.3 and about 0.7 and between about 1 and about 2, respectively, and a reaction temperature between about 1800° F. and about 2200° F. and a pressure between about 150 and about 350 pounds per square inch gage such that an effluent is produced containing hydrogen and carbon monoxide in a mol ratio above 2:1.

References Cited in the file of this patent
UNITED STATES PATENTS

| Number | Name | Date |
|---|---|---|
| 1,736,065 | Williams | Nov. 19, 1929 |
| 1,988,759 | Svanoe | Jan. 22, 1935 |
| 2,491,518 | Riblett | Dec. 20, 1949 |
| 2,532,514 | Phinney | Dec. 5, 1950 |
| 2,566,936 | Garrison | Sept. 4, 1951 |
| 2,606,158 | Stewart | Aug. 5, 1952 |